(12) United States Patent
Akatsuka et al.

(10) Patent No.: US 12,365,386 B2
(45) Date of Patent: Jul. 22, 2025

(54) VEHICLE STEERING SYSTEM AND VEHICLE STEERING METHOD

(71) Applicant: TOYOTA JIDOSHA KABUSHIKI KAISHA, Toyota (JP)

(72) Inventors: Kosuke Akatsuka, Mishima (JP); Rio Suda, Toyota (JP); Yoshio Kudo, Machida (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 358 days.

(21) Appl. No.: 17/986,475

(22) Filed: Nov. 14, 2022

(65) Prior Publication Data

US 2023/0234641 A1 Jul. 27, 2023

(30) Foreign Application Priority Data

Jan. 21, 2022 (JP) .................................. 2022-007784

(51) Int. Cl.
*B62D 6/00* (2006.01)
*B62D 5/04* (2006.01)
*B62D 7/15* (2006.01)

(52) U.S. Cl.
CPC ............. *B62D 6/008* (2013.01); *B62D 5/046* (2013.01); *B62D 7/159* (2013.01)

(58) Field of Classification Search
CPC .......... B62D 6/008; B62D 5/04; B62D 5/006; B62D 5/046; B62D 5/0463
See application file for complete search history.

(56) References Cited

U.S. PATENT DOCUMENTS

| | | | | | |
|---|---|---|---|---|---|
| 5,762,157 | A | * | 6/1998 | Uehara | B62D 6/04 180/197 |
| 6,968,920 | B2 | * | 11/2005 | Barton | B62D 6/008 180/443 |
| 8,892,309 | B2 | * | 11/2014 | Fujita | B62D 6/003 701/44 |
| 2001/0027893 | A1 | * | 10/2001 | Nishizaki | B62D 6/00 701/41 |

(Continued)

FOREIGN PATENT DOCUMENTS

| JP | 2019-131013 A | 8/2019 |
|---|---|---|
| JP | 2020-90108 A | 6/2020 |
| JP | 2020-168952 A | 10/2020 |

*Primary Examiner* — Mussa A Shaawat
(74) *Attorney, Agent, or Firm* — Sughrue Mion, PLLC

(57) ABSTRACT

A vehicle steering system is applied to a vehicle including wheels including at least turning wheels and includes a steering member, a reaction actuator, a turning device, and an electronic control unit. The electronic control unit is configured to: control the turning device based on a target turning angle corresponding to an amount of steering of the steering member; control the reaction actuator such that a steering reaction force based on a first turning axial force corresponding to the target turning angle and a second turning axial force corresponding to an output current or an output torque of the turning device is generated; and change a first proportion of the first turning axial force distributed to the steering reaction force and a second proportion of the second turning axial force distributed to the steering reaction force based on a slip rate of the wheels.

9 Claims, 8 Drawing Sheets

(56) References Cited

U.S. PATENT DOCUMENTS

| | | | |
|---|---|---|---|
| 2004/0133324 A1* | 7/2004 | Yasui | B60T 8/172 |
| | | | 701/41 |
| 2005/0205346 A1* | 9/2005 | Aizawa | B60W 40/068 |
| | | | 180/421 |
| 2006/0009894 A1* | 1/2006 | Goto | B62D 6/003 |
| | | | 701/41 |
| 2006/0086560 A1* | 4/2006 | Furusho | B62D 5/0463 |
| | | | 180/446 |
| 2008/0097668 A1* | 4/2008 | Tsuchiya | B62D 5/0472 |
| | | | 701/42 |
| 2008/0255744 A1* | 10/2008 | Yasui | B60T 13/686 |
| | | | 701/70 |
| 2009/0024279 A1* | 1/2009 | Takeda | B62D 6/008 |
| | | | 701/41 |
| 2012/0226417 A1* | 9/2012 | Nishikawa | B62D 6/003 |
| | | | 701/41 |
| 2013/0190988 A1* | 7/2013 | Limpibunterng | B62D 5/008 |
| | | | 701/42 |
| 2014/0008141 A1* | 1/2014 | Kageyama | B60G 3/20 |
| | | | 180/400 |
| 2019/0233005 A1* | 8/2019 | Maeda | B62D 6/008 |
| 2020/0172065 A1 | 6/2020 | Watanabe | |
| 2021/0339798 A1* | 11/2021 | Nakata | B60T 8/172 |

* cited by examiner

VEHICLE STEERING SYSTEM AND VEHICLE STEERING METHOD

CROSS-REFERENCE TO RELATED APPLICATION

This application claims priority to Japanese Patent Application No. 2022-007784 filed on Jan. 21, 2022, incorporated herein by reference in its entirety.

BACKGROUND

1. Technical Field

The present disclosure relates to a vehicle steering system and a vehicle steering method.

2. Description of Related Art

Japanese Unexamined Patent Application Publication No. 2019-131013 (JP 2019-131013 A) discloses a steering control device of a steer-by-wire steering device for a vehicle. The steering control device includes a reaction control unit that calculates a steering reaction force, which is applied from a reaction actuator to a steering wheel. The reaction control unit calculates a degree of grip based on a first estimated axial force based on road surface information and a second estimated axial force based on a vehicle state quantity and changes the steering reaction force according to the calculated degree of grip.

SUMMARY

In the technique described in JP 2019-131013 A, the degree of grip of wheels (tires) is calculated by dividing a self-aligning torque of turning wheels by a lateral force acting on the turning wheels. Accordingly, slip information of wheels in a state in which the vehicle is traveling straight cannot be transmitted to a driver using the steering reaction force. As a result, the driver has difficulty understanding road surface conditions using the steering reaction force at the initial time of steering from the straight traveling state.

The present disclosure provides a vehicular steering system and a vehicle steering method that can allow a driver to easily understand road surface conditions at the initial time of steering a vehicle from a straight traveling state.

A vehicle steering system according to an aspect of the present disclosure is applied to a vehicle including wheels including at least turning wheels and includes a steering member, a reaction actuator, a turning device, and an electronic control unit. The steering member is mechanically separated from the turning wheels. The reaction actuator applies a steering reaction force to the steering member. The turning device turns the turning wheels. The electronic control unit is configured to control the turning device based on a target turning angle corresponding to an amount of steering of the steering member. The electronic control unit is configured to control the reaction actuator such that a steering reaction force based on a first turning axial force corresponding to the target turning angle and a second turning axial force corresponding to an output current or an output torque of the turning device is generated. The electronic control unit is configured to change a first proportion of the first turning axial force distributed to the steering reaction force and a second proportion of the second turning axial force distributed to the steering reaction force based on a slip rate of the wheels.

The electronic control unit may be configured to decrease the first proportion and to increase the second proportion with an increase of an absolute value of the slip rate.

The electronic control unit may be configured to perform vehicle stabilization control when operating conditions including a condition that an absolute value of the slip rate is greater than a threshold value are satisfied. The electronic control unit may be configured to decrease the first proportion and to increase the second proportion in comparison with those at a time point at which the operating conditions become satisfied in a period in which the operating conditions are satisfied.

The electronic control unit may be configured to maintain the first proportion and the second proportion at a time point at which the operating conditions stop being satisfied in a predetermined period subsequent to the period in which the operating conditions are satisfied.

The slip rate may be a slip rate of the turning wheels.

According to another aspect of the present disclosure, there is provided a vehicle steering method that is applied to a vehicle including wheels including at least turning wheels, the vehicle steering method controlling a reaction actuator that applies a steering reaction force to a steering member that is mechanically separated from the turning wheels and a turning device that turns the turning wheels. The vehicle steering method includes: controlling the turning device based on a target turning angle corresponding to an amount of steering of the steering member; controlling the reaction actuator such that a steering reaction force based on a first turning axial force corresponding to the target turning angle and a second turning axial force corresponding to an output current or an output torque of the turning device is generated; and changing a first proportion of the first turning axial force distributed to the steering reaction force and a second proportion of the second turning axial force distributed to the steering reaction force based on a slip rate of the wheels.

The first turning axial force is a turning axial force based on the target turning angle and thus does not reflect road surface information. On the other hand, the second turning axial force is a turning axial force based on an output current or an output torque of the turning device and thus reflects road surface information. According to the present disclosure, the first proportion of the first turning axial force and the second proportion of the second turning axial force are changed based on the slip rate of the wheels. With this configuration, the electronic control unit can acquire road surface information using the slip rate acquired when the vehicle is traveling straight. The electronic control unit can change the first proportion and the second proportion based on the slip rate in the straight traveling state. That is, in preparation of steering from the straight traveling state, the first proportion and the second proportion can be appropriately changed beforehand based on road surface conditions. Accordingly, it is possible to allow a driver to easily understand the road surface conditions at the initial time of steering a vehicle from a straight traveling state.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the accompanying drawings. When numerical values such as the numbers of elements, amounts, volumes, and ranges are mentioned in the following embodiments, the technical spirit of the present disclosure is not limited to the mentioned numerical values unless the numerical values are clearly described or unless the numerical values are clearly defined in principle.

1. First Embodiment 1-1. Example of Configuration of Vehicle Steering System

Figure 1:
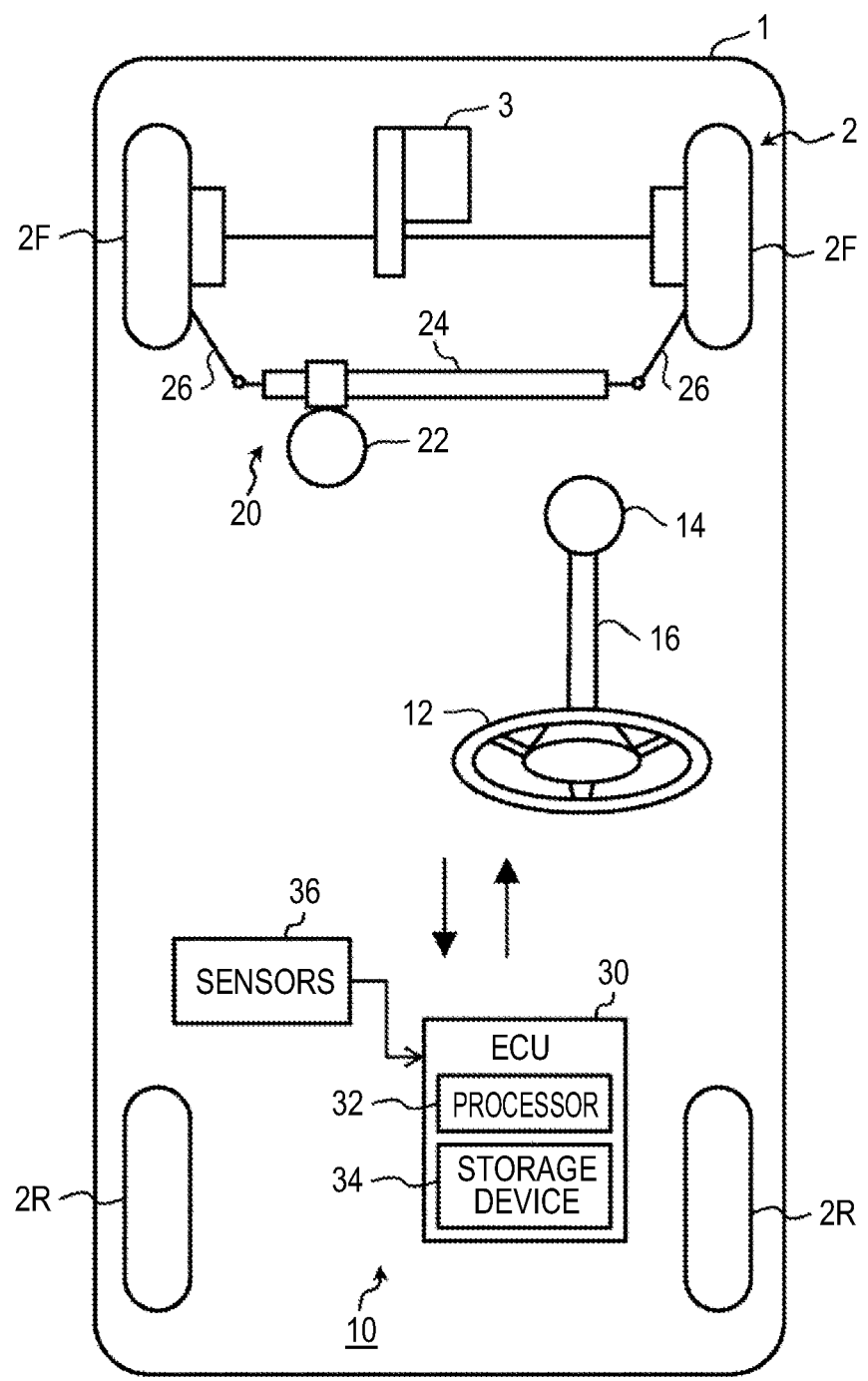
FIG. 1 is a diagram illustrating an example of a configuration of a vehicle steering system according to a first embodiment.

FIG. 1 is a diagram illustrating an example of a configuration of a vehicle steering system 10 according to a first embodiment. The vehicle steering system 10 is applied to a vehicle 1. The vehicle 1 includes four wheels 2. In the following description, front wheels may be referred to as 2F, and rear wheels may be referred to as 2R. For example, the vehicle 1 is a front-wheel-drive vehicle in which the front wheels 2F are driven by a drive device (for example, an electric motor) 3. The "vehicle" to which a "vehicle steering system" according to the present disclosure is applied may be, for example, a rear-wheel-drive vehicle or a four-wheel-drive vehicle. Turning wheels of the "vehicle" according to the present disclosure are not limited to the front wheels, but may be four wheels.

The vehicle steering system 10 includes a steering member 12, a reaction actuator 14, a turning device 20, and an electronic control unit (ECU) 30.

The steering member 12 is operated by a driver. The steering member 12 is, for example, a steering wheel but may be another steering member such as a joystick. The vehicle steering system 10 is of a steer-by-wire type, and the steering member 12 is mechanically separated from the front wheels 2F that are turning wheels.

The steering member (steering wheel) 12 is connected to the reaction actuator 14 via a steering shaft 16. The reaction actuator 14 is, for example, a reaction motor. The reaction actuator 14 applies a steering reaction force Tr to the steering member 12. More specifically, in the example in which the steering member 12 is a steering wheel, the steering reaction force Tr is a steering reaction torque.

The turning device 20 turns the front wheels (hereinafter also referred to as "turning wheels") 2F. The turning device 20 includes a turning actuator 22, a turning shaft (rack shaft) 24, and a tie rod 26. The turning actuator 22 is, for example, a turning motor and is attached to the turning shaft 24. The turning wheels 2F are connected to the turning shaft 24 via the tie rod 26. By driving the turning actuator 22 to translationally move the turning shaft 24 in an axial direction thereof, a turning angle (an actual turning angle) δ of the turning wheels 2F is changed via the tie rod 26.

The ECU 30 controls the reaction actuator 14 and the turning device 20 (the turning actuator 22). Specifically, the ECU 30 includes a processor 32, a storage device 34, and an input/output interface. The input/output interface receives sensor signals from sensors 36 attached to the vehicle 1 and outputs operation signals to the reaction actuator 14 and the turning actuator 22. The processor 32 performs various processes associated with control of the reaction actuator 14 and the turning actuator 22. The storage device 34 stores various programs and various types of data (including a map) which are used for the processes performed by the processor 32. By causing the processor 32 to read a control program from the storage device 34 and to execute the read control program, the processes performed by the ECU 30 are realized. The number of ECUs 30 may be two or more. Specifically, for example, an ECU that controls the reaction actuator 14 and an ECU that controls the turning actuator 22 may be separately provided as the ECU 30.

For example, the sensors 36 include a wheel speed sensor, a steering angle sensor, a turning angle sensor, a turning current sensor, and a lateral acceleration sensor. The wheel speed sensor is provided to correspond to each wheel 2 and detects a wheel speed Vw. In the example in which the steering member 12 is a steering wheel, an amount of steering of the steering member 12 is a rotation angle of the steering wheel, that is, a steering angle (an actual steering angle) θ. The steering angle sensor is attached to the steering shaft 16 and detects a steering angle θ. There is a correlation that is uniquely determined between the rotation angle of the turning actuator 22 and the turning angle δ of the turning wheels 2F. Accordingly, the turning angle sensor is attached to the turning actuator 22 and detects the turning angle δ of the turning wheels 2F. The turning current sensor detects an output current (a driving current) Im of the turning actuator 22. The lateral acceleration sensor detects lateral acceleration Gy of the vehicle 1.

The vehicle steering system 10 is mounted, for example, in a vehicle 1. Accordingly, the steering member 12 is operated by a driver in the vehicle 1. Instead of this example, the vehicle 1 may be operated by a remote driver who remotely drives the vehicle 1. Accordingly, in order for the remote driver to remotely drive the vehicle 1, a part of the vehicle steering system 10 may be provided, for example, in a remote driving center that can communicate with the vehicle 1 via a wireless communication network. Specifically, at least the steering member 12 and the reaction actuator 14 in the vehicle steering system 10 may be provided in a remote driving terminal that is used for the remote driver to remotely drive the vehicle 1 in the remote driving center.

1-2. Control of Vehicle Steering System

Figure 2:
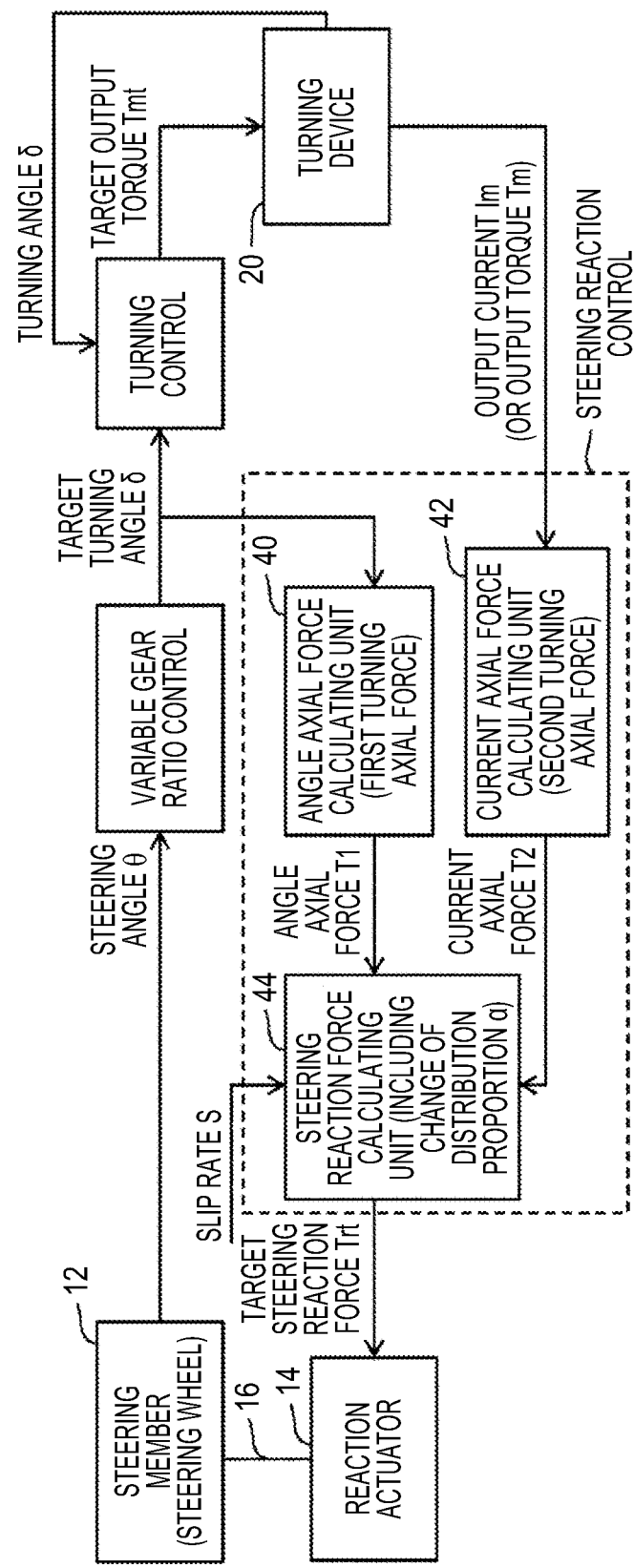
FIG. 2 is a block diagram illustrating an outline of control, which is performed by the vehicle steering system.

FIG. 2 is a block diagram schematically illustrating control that is performed by the vehicle steering system 10.

Control of the vehicle steering system 10 includes "turning control" and "steering reaction control." As in the example illustrated in FIG. 2, the control of the vehicle steering system 10 may include "variable gear ratio control."

1-2-1. Turning Control

In turning control, the ECU 30 controls the turning actuator 22 such that the (actual) turning angle δ of the turning wheels 2F approaches a target turning angle δt. Basically, the ECU 30 calculates the target turning angle δt corresponding to the steering angle θ of the steering member 12 that is detected by the steering angle sensor. Characteristics of the target turning angle δt with respect to the steering angle θ may be fixed, or may be variable, for example, through variable gear ratio control. In the vehicle steering system 10 illustrated in FIG. 1, the turning device 20 is mechanically separated from the steering member 12 as described above. Accordingly, variable gear ratio control in the vehicle steering system 10 is to vary a virtual gear ratio (an angle ratio) of the turning angle δ with respect to the steering angle θ. The virtual gear ratio varies depending on a parameter such as a vehicle speed V.

In turning control, the ECU 30 calculates a target output torque Tmt of the turning actuator 22 based on a difference between the calculated target turning angle δt and the turning angle δ detected by the turning angle sensor. The target output torque Tmt is a target value of an output torque Tm for decreasing the difference. In the turning device 20, the output current (a driving current) Im of the turning actuator 22 is controlled such that the turning actuator 22 generates the output torque Tm corresponding to the target output torque Tmt from the ECU 30. As a result, the turning wheels 2F are turned by the turning actuator 22 (the turning device 20).

1-2-2. Steering Reaction Control

In steering reaction control, the ECU 30 controls a steering reaction force (a steering reaction torque) Tr applied to the steering member 12 by controlling the reaction actuator 14. Specifically, in association with steering reaction control, the ECU 30 includes an angle axial force calculating unit 40, a current axial force calculating unit 42, and a steering reaction force calculating unit 44.

Both the angle axial force T1 and the current axial force T2 correspond to an axial force acting on the turning shaft 24 connected to the turning wheels 2F (a force transmitted to the turning wheels 2F). In the example of the steering member (steering wheel) 12 in which the steering reaction force Tr is a steering reaction torque, the axial forces T1 and T2 are calculated in the same dimension (Nm) as a torque.

The angle axial force calculating unit 40 calculates the angle axial force T1 (a first turning axial force) based on the target turning angle δt. For example, the angle axial force T1 is calculated such that an absolute value thereof increases as the absolute value of the target turning angle δt increases. In this way, the angle axial force T1 is an axial force corresponding to the target turning angle δt based on a driver's operation of the steering member 12 and corresponds to an ideal axial force in which road surface information is not reflected. The angle axial force T1 may be calculated, for example, based on the vehicle speed (a vehicle body speed) V in addition to the target turning angle δt. For example, the angle axial force T1 may be calculated such that the absolute value thereof increases as the vehicle speed V increases.

The current axial force calculating unit 42 calculates the current axial force T2 (a second turning axial force) based on the output current Im of the turning actuator 22 (the turning device 20). The current axial force T2 is based on the output current Im in this way and thus corresponds to an estimated value of an axial force in which road surface information is reflected. Specifically, the current axial force T2 is an axial force based on a force that is applied to the turning wheels 2F from the road surface. For example, the current axial force T2 is calculated such that an absolute value thereof increases as the absolute value of the output current Im increases and a torque applied from the turning actuator 22 to the turning shaft 24 and a torque corresponding to a force applied from the road surface to the turning wheels 2F are balanced. The current axial force T2 may be calculated based on the output torque Tm instead of the output current Im.

The steering reaction force calculating unit 44 calculates a target steering reaction force Trt which is a target value of the steering reaction force Tr based on the angle axial force T1 and the current axial force T2 which are calculated as described above. The target steering reaction force Trt is expressed, for example, by Expression (1).

$$Trt = \alpha \times T2 + (1-\alpha) \times T1 \quad (1)$$

In Expression (1), α corresponds to a proportion (first proportion) of the current axial force T2 (a second turning axial force) distributed to (reflected in) the target steering reaction force Trt and is hereinafter referred to as a "distribution proportion α." The distribution proportion α has a value equal to or greater than 0 and equal to or less than 1. In the example in which Expression (1) is used, a proportion of the angle axial force T1 (a first turning axial force) distributed to (reflected in) the target steering reaction force Trt is set to a value $(=1-\alpha)$ obtained by subtracting the distribution proportion α from 1. Accordingly, in this example, when the distribution proportion α of the current axial force T2 increases, the distribution proportion $(1-\alpha)$ of the angle axial force T1 decreases. For example, when the distribution proportion α is 0.3, a sum of a value of 30% of the current axial force T2 and a value of 70% of the angle axial force T1 is calculated as the target steering reaction force Trt.

In steering reaction control, the ECU 30 controls the reaction actuator 14 such that the steering reaction force Tr corresponding to the calculated target steering reaction force Trt is generated.

In the example of the remote driving system in which a remote driver remotely drives the vehicle, at least some of the processes of the ECU 30 associated with the turning control, the steering reaction control, and the variable gear ratio control illustrated in FIG. 2 may be performed by an ECU which is provided in the remote driving center. In other words, in the example of the remote driving system, at least a part of a flow of signals indicated by arrows in FIG. 2 is realized via a wireless communication network.

1-2-2-1. Change of Distribution Proportion Based on Slip Rate of Wheels

In the steering reaction control according to the first embodiment, the ECU 30 changes (controls) the distribution proportion α based on the slip rate S of the wheels 2 (tires).

The slip rate S of each wheel 2 is expressed by Expression (2) based on the wheel speed Vw detected by the wheel speed sensor and the vehicle body speed V. The slip rate S is basically normally calculated for each wheel 2 while the vehicle 1 is traveling.

$$S=(Vw-V)/V \quad (2)$$

In a front-wheel-drive vehicle 1, for example, an average value or a larger value of the wheel speeds Vw of two rear wheels 2R corresponding to driven wheels is used as the vehicle body speed V. This is the same in a rear-wheel-drive vehicle. In an example of a four-wheel-drive vehicle, for example, a value of a second lowest wheel speed Vw of the wheel speeds Vw of fourth wheels is used as the vehicle body speed V. When a driving wheel slips at the time of acceleration, the slip rate S increases in a positive direction as the generated slip increases. On the other hand, when a wheel slips at the time of braking, the slip rate S increases in a negative direction as the generated slip increases.

More specifically, in the first embodiment, change of the distribution proportion $\alpha$ based on the slip rate S is performed such that the distribution proportion $\alpha$ (a second proportion) of the current axial force T2 increases with an increase in the absolute value of the slip rate S. Therewith, a first proportion (a distribution proportion $(1-\alpha)$) of the angle axial force T1 decreases with an increase in the absolute value of the slip rate S.

Figure 3A:
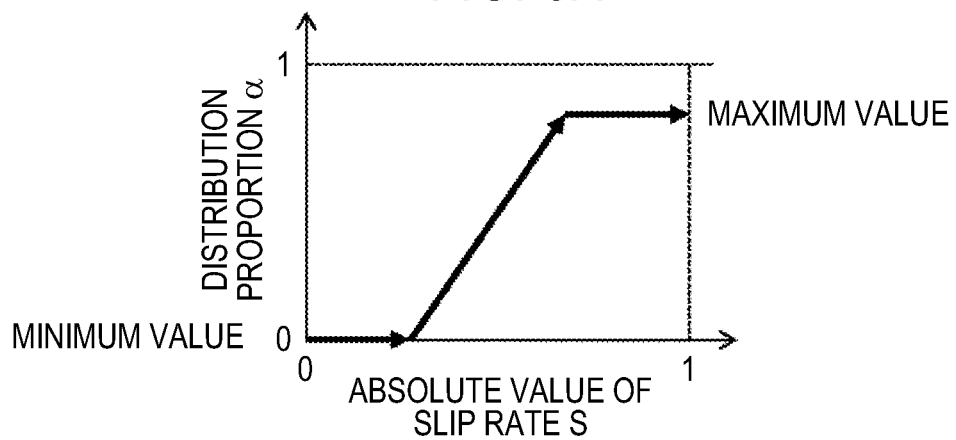
FIGS. 3A to 3C are diagrams illustrating various examples for change of a distribution proportion α based on a slip rate S according to the first embodiment.
Figure 3B:
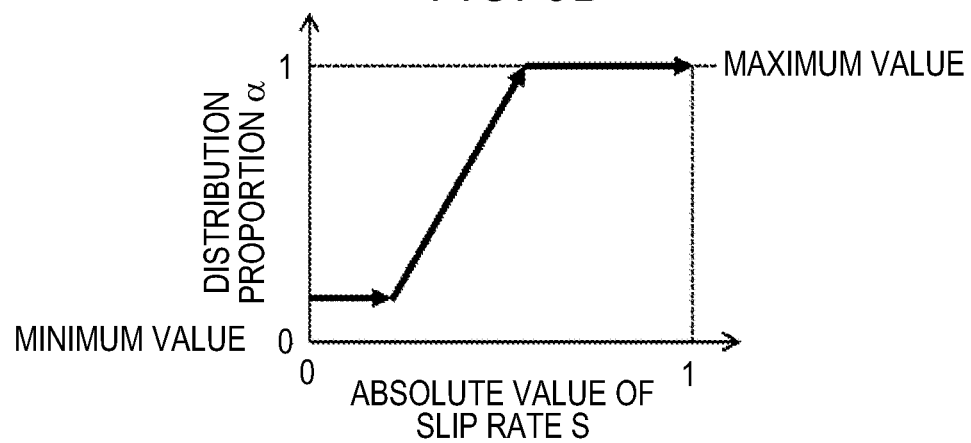
Figure 3C:
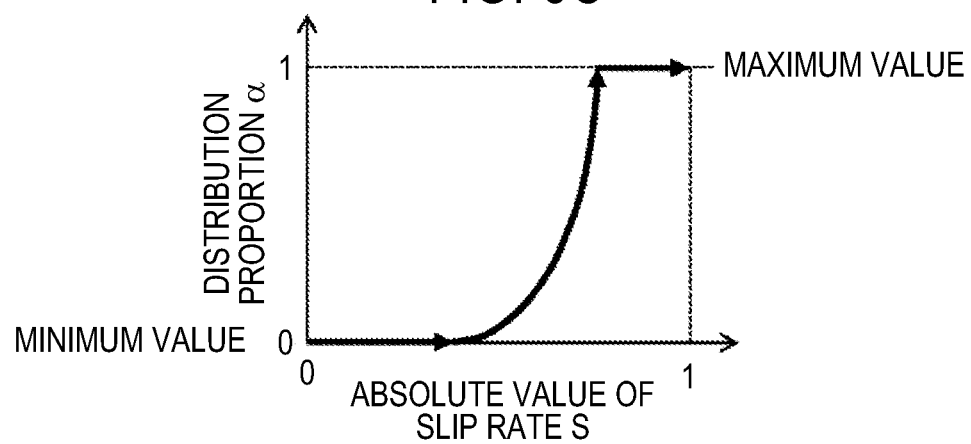

FIGS. 3A to 3C are diagrams illustrating various examples associated with change of the distribution proportion $\alpha$ based on the slip rate S according to the first embodiment. As illustrated in FIGS. 3A to 3C, as long as the distribution proportion $\alpha$ increases with an increase in the absolute value of the slip rate S, a minimum value, a maximum value, an inflection point, and a shape of change of the distribution proportion $\alpha$ are not particularly limited.

As illustrated in FIGS. 3A to 3C, the minimum value of the distribution proportion $\alpha$ may be 0 and thus the maximum value of the distribution proportion $(1-\alpha)$ may be 1. Alternatively, as illustrated in FIG. 3B, the minimum value of the distribution proportion $\alpha$ may be a value greater than 0 and thus the maximum value of the distribution proportion $(1-\alpha)$ may be a value less than 1.

As illustrated in FIGS. 3B and 3C, the maximum value of the distribution proportion $\alpha$ may be 1 and thus the minimum value of the distribution proportion $(1-\alpha)$ may be 0. Alternatively, as illustrated in FIG. 3A, the maximum value of the distribution proportion $\alpha$ may be a value less than 1 and thus the minimum value of the distribution proportion $(1-\alpha)$ may be a value greater than 0.

The number of inflection points in a function of the distribution proportion $\alpha$ with respect to the absolute value of the slip rate S is not limited to the example of 2 illustrated in FIGS. 3A to 3C, but may be 0, 1, or 3 or more. With respect to the absolute value of the slip rate S, for example, the distribution proportion $\alpha$ may increase linearly as illustrated in FIGS. 3A and 3B or may increase in a curved shape (for example, exponentially) as illustrated in FIG. 3C.

In the first embodiment, the slip rate S of the turning wheels (front wheels) 2F is used to change the distribution proportion $\alpha$. However, the slip rate S of wheels (rear wheels 2R in the example of the vehicle 1) other than the turning wheels may be used to change the distribution proportion $\alpha$ in addition to or instead of the slip rate S of the front wheels 2F.

Figure 4:
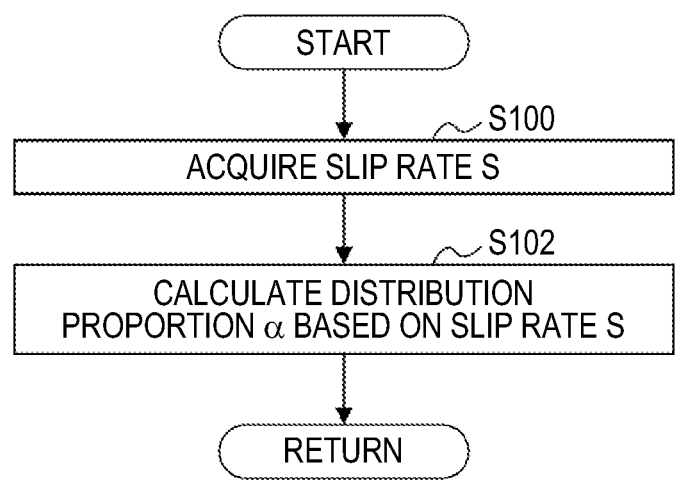
FIG. 4 is a flowchart illustrating an example of a routine for changing a distribution proportion a according to the first embodiment.

FIG. 4 is a flowchart illustrating an example of a routine for changing the distribution proportion $\alpha$ according to the first embodiment. The routine of this flowchart is repeatedly performs while the vehicle 1 is traveling. More specifically, the routine illustrated in FIG. 4 is included in the processes which are performed by the steering reaction force calculating unit 44 (see FIG. 2).

In Step S100, the ECU 30 (the processor 32) acquires the slip rate S of the front wheels 2F. More specifically, the slip rate S acquired in Step S100 is, for example, an average value of the slip rates S of two front wheels 2F. Alternatively, the slip rate with the larger absolute value out of the slip rates S of two front wheels 2F may be acquired.

Then, in Step S102, the ECU 30 changes the distribution proportion $\alpha$ based on the slip rate S. Specifically, the storage device 34 of the ECU 30 stores relationships between the distribution proportion $\alpha$ and the absolute value of the slip rate S illustrated in FIGS. 3A to 3C as a map or a relational expression. The ECU 30 calculates the distribution proportion $\alpha$ corresponding to the absolute value of the slip rate S acquired in Step S100 with reference to such a map or relational expression.

The distribution proportion $\alpha$ calculated in Step S102 is used to calculate the target steering reaction force Trt based on the angle axial force T1 and the current axial force T2 calculated as illustrated in FIG. 2.

1-3. Advantages

As described above, with the steering reaction control according to the first embodiment, the distribution proportion $\alpha$ is changed based on the slip rate S. By using the slip rate S to change the distribution proportion $\alpha$ in this way, the ECU 30 can acquire road surface information using the slip rate S acquired when the vehicle 1 is in a straight traveling state. Then, the ECU 30 can change the distribution proportion to the distribution proportion $\alpha$ based on the slip rate S in the straight traveling state in advance (see Step S102). That is, in preparation of steering from the straight traveling state, it is possible to appropriately change the distribution proportion $\alpha$ according to the road surface conditions in advance. Accordingly, it is possible to cause a driver to easily understand the road surface conditions at the initial time of steering from the straight traveling state of the vehicle 1.

More specifically, with the steering reaction control according to the first embodiment, the distribution proportion $\alpha$ increases with an increase of the slip rate S. Accordingly, the angle axial force T1 decreases and the current axial force T2 increases.

Here, when the absolute value of the slip rate S increases (for example, when the vehicle is traveling on a low-µ road such as a snowy road or when hydroplaning phenomenon occurs), a force received from the road surface is zero or is sufficiently small even when the turning wheels 2F are turned. As a result, since the output current Im decreases (the same is true of the output torque Tm), the current axial force T2 decreases. The current axial force T2 is not generated in the straight traveling state in which a steering operation of the steering member 12 is not performed but is generated based on the output current Im (or the output torque Tm) generated due to turning of the turning wheels 2F with the steering operation. Accordingly, when a method of increasing the distribution proportion $\alpha$ based on the magnitude of the output current Im (or the output torque Tm) after turning of the turning wheels 2F has been actually started is employed, a time is required until the current axial force T2 corresponding to the road surface conditions is reflected in the steering reaction force Tr at the time of traveling on a low-µ road or the like. As a result, it takes time for a driver to understand the road surface conditions using the steering reaction force Tr in which the current axial force T2 corresponding to the road surface conditions is reflected.

On the other hand, with the steering reaction control according to the first embodiment, the ECU 30 can acquire road surface information based on the slip rate S in the straight traveling state and increase the distribution proportion α before the steering operation is started. Accordingly, the current axial force T2 corresponding to the output current Im (or the output torque Tm) which is generated when a steering operation is actually performed thereafter can be rapidly reflected in the steering reaction force Tr at a high distribution proportion α. When the distribution proportion α of the current axial force T2 increases, an influence of the road surface conditions is more greatly reflected in the steering reaction force Tr. More specifically, since the distribution proportion α of the current axial force T2 calculated as a small value due to traveling on the low-μ road increases, the steering reaction force Tr decreases. Accordingly, a driver can rapidly receive the steering reaction force Tr which is felt small with respect to the steering angle θ based on the driver's steering operation via the steering member 12 at the initial time of steering from the straight traveling state. In this way, the driver can rapidly understand the road surface conditions using the steering reaction force Tr.

With the steering reaction control according to the first embodiment, the slip rate S of the turning wheels 2F is used as the slip rate S for changing the distribution proportion α. Accordingly, it is possible to more appropriately change the distribution proportion α using information of the slip rate S of the turning wheels 2F which are steered by the steering member 12.

2. Second Embodiment

In a second embodiment, the ECU 30 changes the "first proportion" of the first turning axial force and the "second proportion" of the second turning axial force according to the present disclosure based on a "slip rate of a wheel" by changing the distribution proportion α based on the slip rate S. The second embodiment is different from the first embodiment in a specific method of changing the distribution proportion α based on the slip rate S.

2-1. Change of Distribution Proportion Based on Slip Rate of Wheel

Specifically, in the second embodiment, "vehicle stabilization control A" including a condition that the absolute value of the slip rate S is greater than a threshold value as an operating condition is performed. The vehicle stabilization control A is, for example, traction control (TRC). The TRC is performed to curb idling of the driving wheels (front wheels) 2F at the time of starting or acceleration of the vehicle 1. The operating condition of the TRC is satisfied when the slip rate S (a positive value) of the driving wheels 2F is greater than a threshold value TH1. As a result, the TRC operates (is turned on). In the TRC, a torque of a wheel to be controlled is controlled such that the slip rate S of the driving wheel 2F (a wheel to be controlled) in which the slip rate S is greater than the threshold value TH1 decreases to a target slip rate. This control of a torque can be performed by decreasing a torque of a drive device 3 or applying a braking force to the wheel to be controlled. Accordingly, idling of the wheel to be controlled is curbed. The TRC is released (is turned off) when the slip rate S of the wheel to be controlled is less than a threshold value TH2 less than the threshold value TH1.

Another example of vehicle stabilization control A is anti-lock brake control (ABS control). The ABS control is turned on when the absolute value of the slip rate S (a negative value) of a wheel 2 is greater than a threshold value TH3. As a result, the ABS control operates (is turned on). With the ABS control, the braking force applied to the wheels 2 is controlled such that the actual slip rate S of the wheel 2 which tends to be locked approaches a target slip rate. Accordingly, locking of the wheel 2 is avoided. The ABS control is released (is turned off) when the slip rate S of the wheel 2 which tends to be locked is less than a threshold value TH4 less than the threshold value TH3.

In the second embodiment, the ECU 30 changes (controls) the distribution proportion α according to the operating state of the vehicle stabilization control A such as TRC or ABS control. Specifically, the ECU 30 increases the distribution proportion α in comparison with that at a time point t1 at which the operating condition has been satisfied (see FIG. 5) in a period (a period (t1 to t2) illustrated in FIG. 5) in which the operating condition of the vehicle stabilization control A is satisfied. That is, in comparison with those at the time point t1 at which the operating condition has been satisfied in the period (t1 to t2), the first proportion (distribution proportion (1−α)) of the angle axial force T1 decreases and the second proportion (distribution proportion α) of the current axial force T2 increases.

Figure 5:
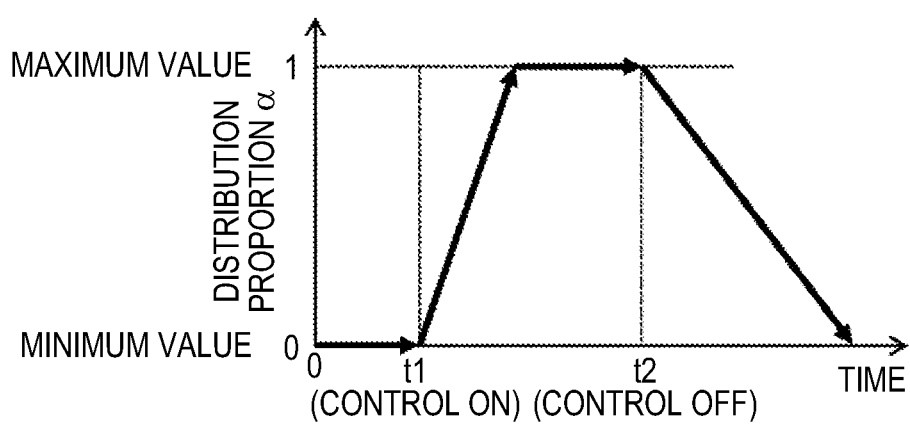
FIG. 5 is a timing chart illustrating an example of a change of a distribution proportion α based on a slip rate S according to a second embodiment.

FIG. 5 is a timing chart illustrating an example of a change of the distribution proportion α based on the slip rate S according to the second embodiment. In the example illustrated in FIG. 5, when the operating condition of the vehicle stabilization control A is satisfied (control ON at a time point t1), the ECU 30 increases the distribution proportion α from 0 which is an example of the minimum value to 1 which is an example of the maximum value with the elapse of time. When the vehicle stabilization control A is continuously operating after the distribution proportion α has reached the maximum value, the ECU 30 maintains the distribution proportion α at the maximum value. When the operating condition of the vehicle stabilization control A is unsatisfied (control OFF at a time point t2), for example, the ECU 30 decreases the distribution proportion α to the minimum value with the elapse of time. The minimum value, the maximum value, an increase gradient, a decrease gradient, and a shape of change of the distribution proportion α can be arbitrarily set instead of those in the example illustrated in FIG. 5.

Figure 6:
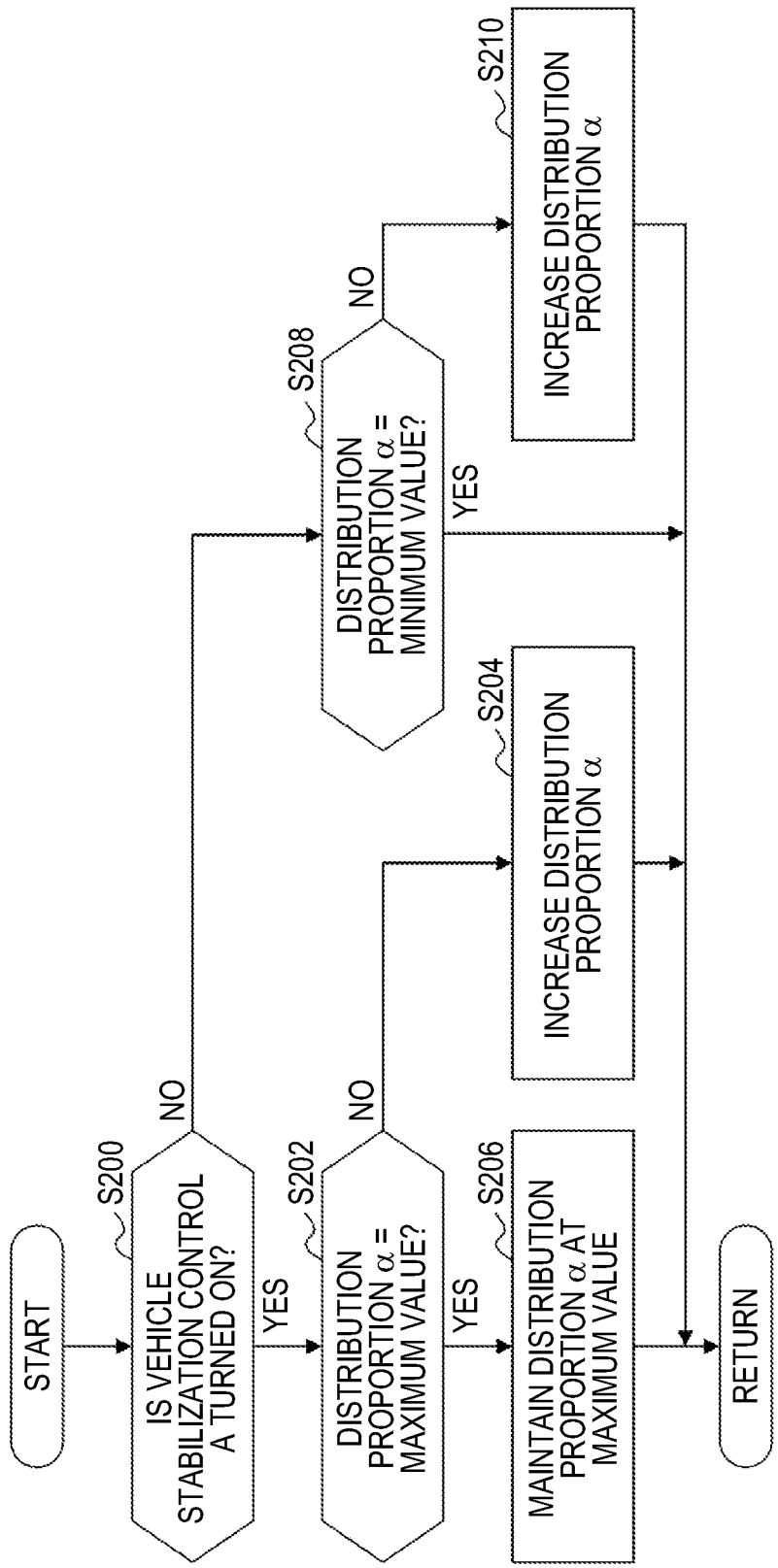
FIG. 6 is a flowchart illustrating an example of a routine for changing the distribution proportion a according to the second embodiment.

FIG. 6 is a flowchart illustrating an example of a routine for changing the distribution proportion α according to the second embodiment. The routine of this flowchart is repeatedly performed while the vehicle 1 is traveling.

In Step S200, the ECU 30 determines whether the operating conditions of the vehicle stabilization control A are satisfied. When the determination result thereof is YES (that is, when the operating conditions including a condition that the absolute value of the slip rate S is greater than a threshold value are satisfied), the routine proceeds to Step S202.

In Step S202, the ECU 30 determines whether the distribution proportion α is equal to the maximum value (for example, 1). When it is determined that the distribution proportion α has not reached the maximum value, the ECU 30 increases the distribution proportion α, for example, by a predetermined amount in Step S204. Thereafter, the routine ends.

On the other hand, when it is determined in Step S202 that the distribution proportion α has reached the maximum value, the ECU 30 maintains the distribution proportion α at the maximum value in Step S206. Thereafter, the routine ends.

When the determination result of Step S200 is NO (that is, when the operating conditions of the vehicle stabilization control A are not satisfied), the routine proceeds to Step S208. In Step S208, the ECU 30 determines whether the distribution proportion α is equal to the minimum value.

When it is determined in Step S208 that the distribution proportion α has reached the minimum value, the routine ends. On the other hand, when it is determined that the distribution proportion α has not reached the minimum value, the ECU 30 decreases the distribution proportion α, for example, by a predetermined amount in Step S210. Thereafter, the routine ends.

2-2. Advantages

As described above, the distribution proportion α is also changed based on the slip rate S through the steering reaction control according to the second embodiment. More specifically, since the operating conditions for the vehicle stabilization control A are satisfied, the distribution proportion α increases in a situation in which the absolute value of the slip rate S is greater than the threshold value. Accordingly, when steering from the straight traveling state is performed in the period (t1 to t2) in which the vehicle stabilization control A is performed at the time of traveling on a low-μ road or the like, a driver can rapidly receive the steering reaction force Tr in which the distribution proportion α of the current axial force T2 has increased via the steering member 12. Accordingly, the driver can rapidly understand the road surface conditions using the steering reaction force Tr.

2-3. Modified Examples

Figure 7:
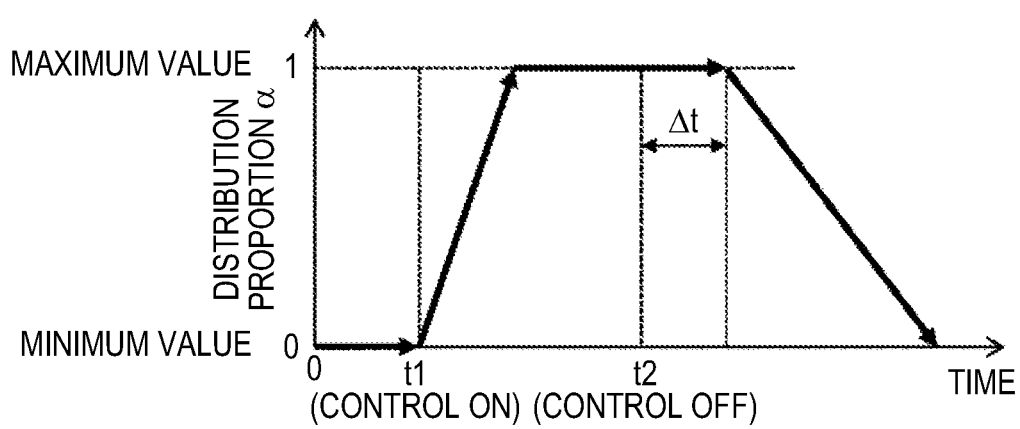
FIG. 7 is a timing chart illustrating an example of a change of the distribution proportion α based on a slip rate S according to a modified example of the second embodiment.

FIG. 7 is a timing chart illustrating an example of a change of a distribution proportion α based on a slip rate S according to a modified example of the second embodiment. In the example illustrated in FIG. 7, the ECU 30 maintains the distribution proportion α at a value (for example, a maximum value) at a time point t2 at which the vehicle stabilization control A has been turned off in a predetermined period Δt subsequent to the period (t1 to t2) in which the operating conditions of the vehicle stabilization control A are satisfied. That is, in the predetermined period Δt, the second proportion (the distribution proportion α) of the current axial force T2 and the first proportion (the distribution proportion (1−α)) of the angle axial force T1 are kept constant.

Figure 8:
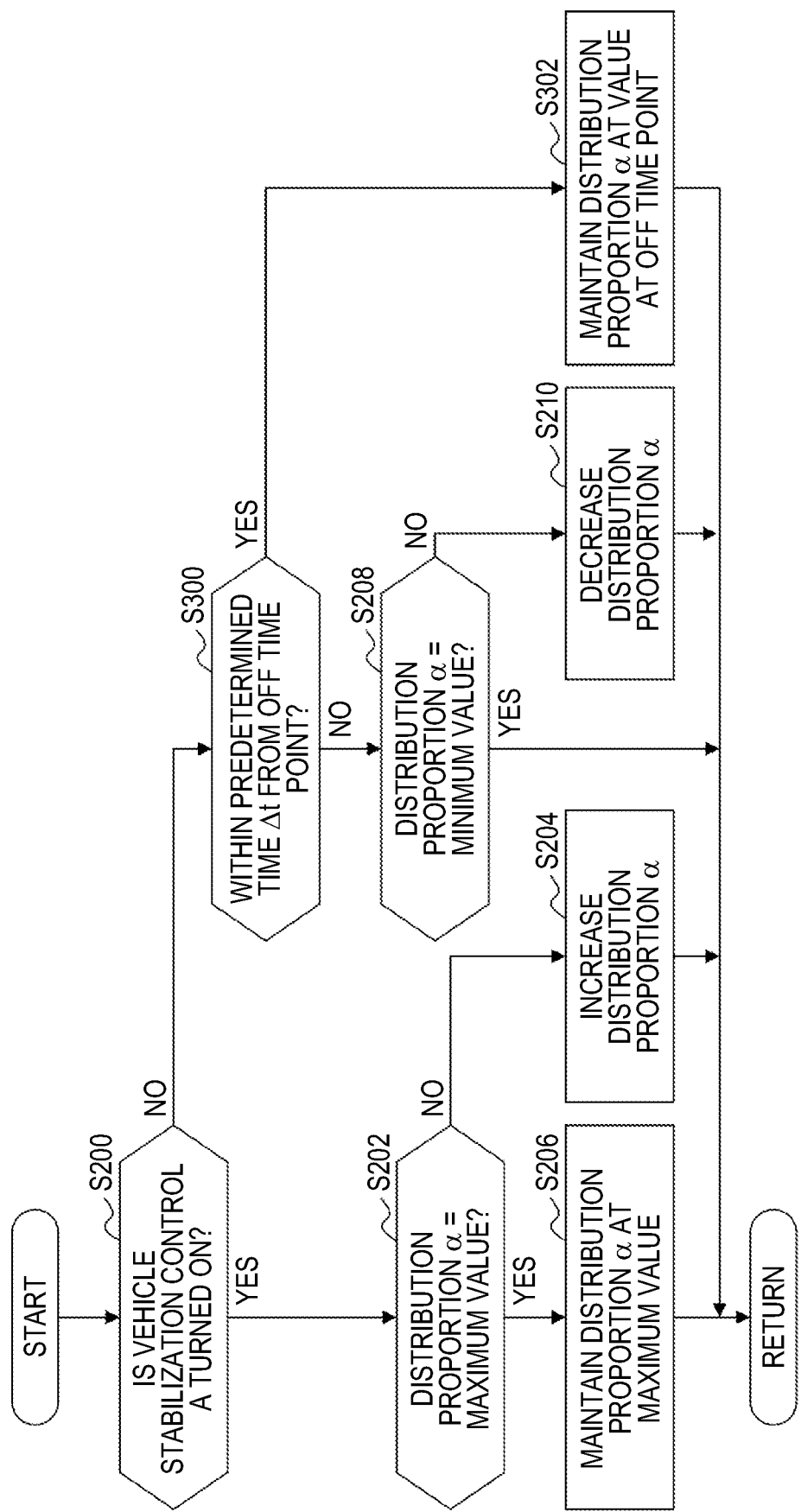
FIG. 8 is a flowchart illustrating an example of a routine for changing the distribution proportion a according to a modified example of the second embodiment.

FIG. 8 is a flowchart illustrating an example of a routine for changing the distribution proportion α according to a modified example of the second embodiment. The routine of this flowchart is the same as the routine of the flowchart illustrated in FIG. 6 except that the processes of Steps S300 and S302 are added.

In FIG. 8, when the determination result of Step S200 is NO (that is, when the vehicle stabilization control A is turned off), the routine proceeds to Step S300.

In Step S300, the ECU 30 determines whether the current time is in a predetermined period Δt from a time point at which the vehicle stabilization control A has turned off (in other words, a time point at which the operating conditions have been unsatisfied) t2. When it is determined that the current time is in the predetermined period Δt, the routine proceeds to Step S302. On the other hand, when it is determined that the current time is after the predetermined period Δt, the routine proceeds to Step S208.

In Step S302, the ECU 30 maintains the distribution proportion α at a value at the time point at which the vehicle stabilization control A has been turned off.

The vehicle stabilization control A such as TRC or ABS control may be turned on again in a short time after it has been turned off. With the routine illustrated in FIG. 8, it is possible to curb occurrence of hunting in the steering reaction force Tr due to repetition of ON and OFF of the vehicle stabilization control A. In addition, the predetermined period Δt is set to a value necessary (suitable) for curbing the hunting.

In the second embodiment and the modified example thereof, when the vehicle stabilization control A is TRC, changing of the distribution proportion α with operating of the TRC may be performed in only a vehicle in which the driving wheels match the turning wheels such as the front-wheel-drive vehicle 1. In such a vehicle, information of the slip rate S of the driving wheels is the same as information of the slip rate S of the turning wheels. Accordingly, it is possible to more appropriately change the distribution proportion α using the information of the slip rate S of the turning wheels to be steered by the steering member during operation of the TRC. Another example of the vehicle in which the driving wheels match the turning wheels is a four-wheel-drive vehicle in which four wheels can be steered.

The vehicle stabilization control A in which the distribution proportion α is changed based on the slip rate S according to the second embodiment and the modified example thereof is not limited to the TRC and the ABS control as long as a condition that the slip rate S is greater than a threshold value is included as an operating condition. That is, for example, when the "condition that the slip rate S is greater than a threshold value" is included as an operating condition of vehicle stability control (VSC), changing of the distribution proportion α based on the slip rate S may be performed on the VSC in the same way.

Figure 9:
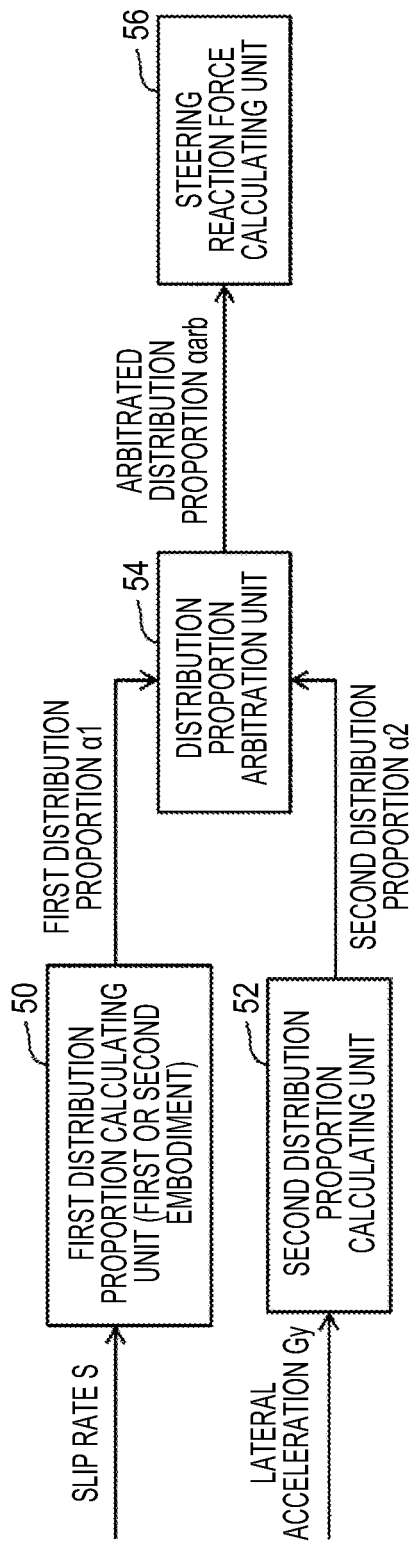
FIG. 9 is a functional block diagram of an electronic control unit associated with calculation of a target steering reaction force Trt according to another embodiment.

3. Other Embodiments 3-1. Another Example of Calculation of Target Steering Reaction Force Trt FIG. 9 is a functional block diagram of an ECU 30 associated with calculation of a target steering reaction force Trt according to another embodiment. In the example illustrated in FIG. 9, the distribution proportion α that is changed based on the slip rate S in the first or second embodiment is referred to as a "first distribution proportion α1." A first distribution proportion calculating unit 50 in FIG. 9 corresponds to a functional block that calculates the first distribution proportion α1 based on the slip rate S using the method according to the first or second embodiment.

In the example illustrated in FIG. 9, in addition to the first distribution proportion α1, a second distribution proportion α2 is calculated by a second distribution proportion calculating unit 52. The second distribution proportion α2 corresponds to the distribution proportion of the current axial force T2 similarly to the first distribution proportion α1. The distribution proportion of the angle axial force T1 when the second distribution proportion α2 is used is "1−α2." Accordingly, in the example of the second distribution proportion α2, increasing the second distribution proportion α2 corresponds to increasing the distribution proportion of the current axial force T2 in which road surface information is reflected and decreasing the distribution proportion of the angle axial force T1 in which road surface information is not reflected.

The second distribution proportion calculating unit 52 calculates the second distribution proportion α2 based on a lateral acceleration Gy acting on the vehicle 1 at the time of turning. More specifically, the second distribution proportion calculating unit 52 calculates the second distribution proportion α2 such that the second distribution proportion α increases with an increase in the lateral acceleration Gy. An example of a specific relationship between the lateral acceleration Gy and the second distribution proportion α2 is obtained by replacing the absolute value of the slip rate S on the horizontal axes in FIGS. 3A to 3C with the lateral acceleration Gy. The lateral acceleration Gy used to determine the second distribution proportion α2 is detected, for example, using a lateral acceleration sensor. For example, an estimated lateral acceleration based on the turning angle δ and the vehicle speed V may be used as the lateral acceleration Gy.

Here, the current axial force T2 based on the output current Im is considered to approximately express a self-aligning torque which is a reaction force applied from the road surface to the turning wheels 2F at the time of turning. By considering that a lateral force Fy acting on the turning wheels 2F at the time of turning is substantially the same as a force generated in a vehicle width direction, the lateral force Fy can be approximately expressed by the lateral acceleration Gy. It is known that the self-aligning torque also increases with an increase in the lateral force Fy in an area in which a slip angle of the turning wheels 2F at the time of turning is small. Accordingly, by causing the second distribution proportion calculating unit 52 to calculate the second distribution proportion α2 such that the second distribution proportion α increases with the increase in the lateral acceleration Gy, steering reaction force characteristics that the current axial force T2 is more distributed to the steering reaction force Tr when a large self-aligning torque is generated can be obtained in consideration of the relationship between the lateral force Fy and the self-aligning torque.

A distribution proportion arbitration unit 54 arbitrates between the first distribution proportion α1 and the second distribution proportion α2 and calculates a post-arbitration distribution proportion αarb. Specifically, the distribution proportion αarb may be, for example, an average value of the first distribution proportion α1 and the second distribution proportion α2. Alternatively, in order to actively transmit road surface information to a driver, the larger one of the first distribution proportion α1 and the second distribution proportion α2 may be selected as the distribution proportion αarb.

A steering reaction force calculating unit 56 calculates a target steering reaction force Trt using the post-arbitration distribution proportion αarb. The target steering reaction force Trt is expressed, for example, by Expression (3).

$$Trt = \alpha arb \times T2 + (1 - \alpha arb) \times T1 \quad (3)$$

3-2. Another Example of Calculation of Target Steering Reaction Force Trt

The method of calculating the distribution proportion α according to the first embodiment and the method of calculating the distribution proportion α according to the second embodiment may be combined. Specifically, the distribution proportion α that is calculated to increase with an increase in the absolute value of the slip rate S using the calculation method according to the first embodiment is referred to as a "distribution proportion αe1." The distribution proportion α which is calculated to increase when the operating conditions of the vehicle stabilization control A are satisfied using the calculation method according to the second embodiment is referred to as a "distribution proportion αe2." The ECU 30 may calculate a post-arbitration distribution proportion αarb', for example, by performing arbitration between the distribution proportion αe1 and the distribution proportion αe2 in the same way as the arbitration between the first distribution proportion α1 and the second distribution proportion α2 in FIG. 9. For example, the ECU 30 may calculate the target steering reaction force Trt using the post-arbitration distribution proportion αarb' in the same way as in the example in which the post-arbitration distribution proportion αarb is used. The arbitration between the distribution proportions by the ECU 30 may be performed on three distribution proportions, that is, the distribution proportion αe1, the distribution proportion αe2, and the second distribution proportion α2 (see FIG. 9), in the same way.

What is claimed is:

1. A vehicle steering system that is applied to a vehicle including wheels including at least turning wheels, the vehicle steering system comprising:
    a steering member that is mechanically separated from the turning wheels;
    a reaction actuator that applies a steering reaction force to the steering member;
    a turning actuator that turns the turning wheels; and
    an electronic control unit,
    wherein the electronic control unit is configured to:
        control the turning device based on a target turning angle corresponding to an amount of steering of the steering member;
        control the reaction actuator to generate a steering reaction force based on a first turning axial force corresponding to the target turning angle, and a second turning axial force corresponding to an output current or an output torque of the turning device based on a force applied to the turning wheels from the road surface; and
        change a first proportion of the first turning axial force distributed to the steering reaction force and a second proportion of the second turning axial force distributed to the steering reaction force based on a slip rate of the wheels.

2. The vehicle steering system according to claim 1, wherein the electronic control unit is configured to decrease the first proportion and to increase the second proportion with an increase of an absolute value of the slip rate.

3. The vehicle steering system according to claim 1, wherein the electronic control unit is configured to:
    perform vehicle stabilization control when operating conditions including a condition that an absolute value of the slip rate is greater than a threshold value are satisfied; and
    decrease the first proportion and increase the second proportion in comparison with those at a time point at which the operating conditions become satisfied in a period in which the operating conditions are satisfied.

4. The vehicle steering system according to claim 3, wherein the electronic control unit is configured to maintain the first proportion and the second proportion at a time point at which the operating conditions stop being satisfied in a predetermined period subsequent to the period in which the operating conditions are satisfied.

5. The vehicle steering system according to claim 1, wherein the slip rate is a slip rate of the turning wheels.

6. The vehicle steering system according to claim 1, further comprising a wheel speed sensor configured to detect a speed of a wheel of the vehicle, and
wherein the electronic control unit is configured to determine the slip rate is based on a difference between a speed of the vehicle and the speed of a wheel.

7. The vehicle steering system according to claim 6, further comprising a plurality of wheel speed sensors configured to detect a speed of each wheel of the vehicle, and
wherein the electronic control unit is configured to determine the slip rate for each wheel of the vehicle.

8. The vehicle steering system according to claim 7, wherein the electronic control unit is configured to:
change the first proportion of the first turning axial force distributed to the steering reaction force and the second proportion of the second turning axial force distributed to the steering reaction force based on an average slip rate of the turning wheels, and
decrease the first proportion and increase the second proportion with an increase of an absolute value of the average slip rate of the turning wheels.

9. A vehicle steering method that is applied to a vehicle including wheels including at least turning wheels, the vehicle steering method controlling a reaction actuator that applies a steering reaction force to a steering member that is mechanically separated from the turning wheels and a turning device that turns the turning wheels, the vehicle steering method comprising:
controlling the turning device based on a target turning angle corresponding to an amount of steering of the steering member;
controlling the reaction actuator to generate a steering reaction force based on a first turning axial force corresponding to the target turning angle, and a second turning axial force corresponding to an output current or an output torque of the turning device based on a force applied to the turning wheels from the road surface; and
changing a first proportion of the first turning axial force distributed to the steering reaction force and a second proportion of the second turning axial force distributed to the steering reaction force based on a slip rate of the wheels.

* * * * *